United States Patent [19]

Wessling et al.

[11] Patent Number: 4,925,610
[45] Date of Patent: May 15, 1990

[54] PROCESS FOR THE PRODUCTION OF CONDUCTIVE MOLDED ARTICLES

[75] Inventors: Bernhard M. Wessling; Harald K. Volk, both of Bargteheide, Fed. Rep. of Germany

[73] Assignee: Zipperling Kessler & Co. (GmbH & Co.), Ahrensburg, Fed. Rep. of Germany

[21] Appl. No.: 56,324

[22] Filed: May 28, 1987

Related U.S. Application Data

[63] Continuation of Ser. No. 744,272, Jun. 13, 1985, abandoned.

[30] Foreign Application Priority Data

Jun. 14, 1984 [DE] Fed. Rep. of Germany ....... 3421993

[51] Int. Cl.$^5$ .............................................. B29C 35/00
[52] U.S. Cl. .................................... 264/101; 264/104; 264/105
[58] Field of Search ...................... 264/40.2, 101, 102, 264/104, 105, 294, 73, 81, 82, 85; 252/500, 512, 514; 425/77; 525/197

[56] References Cited

U.S. PATENT DOCUMENTS 4,730,032 3/1988 Rossi et al. .......................... 526/285

OTHER PUBLICATIONS

Chen et al., "Dynamic Viscoclasticity of Polyacetylene", Makromol. Chem., Rapid Commun. 4.503, (1983) pp. 503–506.

*Primary Examiner*—Jill L. Heitbrink
*Attorney, Agent, or Firm*—Cushman, Darby Cushman

[57] ABSTRACT

Substantially solvent-free and monomer-free, conductive organic polymers and/or organic conductors are molded, under moisture and oxygen exclusion, at elevated temperature and under a pressure of at least 500 bar to moldings with a highly lustrous surface which appears metallic. The moldings are suitable for use as electrical conductors, semiconductors or photoconductors. A suitable apparatus for producing the moldings has an inert gas-fillable and evacuatable press capsule, which is placed between a die and an abutment in a heatable molding apparatus.

11 Claims, 5 Drawing Sheets

① DOPED FILM
② SHAPED PART ACCORDING TO THE INVENTION, DOPED

PROCESS FOR THE PRODUCTION OF CONDUCTIVE MOLDED ARTICLES

This is a continuation of application Ser. No. 744,272, filed June 13, 1985 abandoned.

FIELD OF THE INVENTION

The present invention relates to molded articles composed of intrinsically conductive organic polymers and-/or organic conductors, processes for the preparation of such molded articles, and suitable apparatus for producing the molded articles.

BACKGROUND OF THE INVENTION AND PRIOR ART

The synthesis, as well as the chemical, electrical and photoelectrical characteristics of nonpolymeric and polymeric organic semiconductors and conductors have formed the subject of intense research. The state of present knowledge, as well as the various partly differing opinions have been discussed in numerous works, cf G. Wegner, Angew. Chem. Vol. 93, pp. 352 to 371, 1981; M. Hanack, Naturwiss, Vol. 69, pp. 266 to 275, 1982; Fincher et al, Synthetic metals, Vol. 6, pp. 243 to 263, 1983; and K. Seeger, Angew Makromol. Chem., Vol. 109/110, pp. 227 to 251, 1982.

The term "conductive polymer" as defined herein means polyconjugate systems, such as occur in polyacetylene (PAc), poly-1,3,5 ... n-substituted polyacetylenes, acetylene copolymers, as well as 1,3-tetramethylene-bridged polyenes, e.g. polymers resulting from the polymerization of 1,6-heptadiene and similar polyacetylene derivatives. It also includes the various modifications of polyparaphenylenes (PPP), the different modifications of polypyrroles (PPy), the different modifications of polyphthalocyanines (PPhc) and other polymeric conductors, such as polyanilines, polyperinaphthalines etc. They can be present as such or as polymers complexed ("doped") with oxidizing or reducing substances. Complexing generally leads to an increase in the electrical conductivity by several decimal powers and into the metallic range.

The term "organic conductors" as defined herein means nonpolymeric, organic substances, such as complex salts or charge transfer complexes, e.g. the different modifications of tetracyanoquinodimethane (TCNQ) salts.

Conductive polymers are in part obtained as polycrystalline powders, film-like agglomerates or lumps of primary particles. As e.g. polyacetylene is neither soluble nor fusible, it constituted an important advance when Shirakawa was able to produce self-supporting, but very thin films by interfacial polymerization, whose characteristics are similar to those of thin polymer films. Tests carried out on these films concerning the morphology of polyacetylene led to a fibril theory, according to which the polyacetylene is assembled to give elongated fibres through which crystalline regions form in the fibre direction, in which the current flows along the fibre axis following doping (complexing).

The general opinion is that the conductivity is brought about by the high crystallinity and by the arrangement of the polyconjugate systems (optionally in complexed form). However, it has not as yet been adequately clarified whether the conductivity mechanism in polyenes and polyphenylenes, as well as polypyrroles is determined by electron transfers along the chain or at right angles to the chain direction, particularly as the morphology of conductive polymers has also not yet been clarified. In this connection, the inventor has proved that the primary particles of polyacetylene are always extremely fine spherical particles, which in part agglomerate to fibrillar secondary particles and in part agglomerate to non-directed foil-like film, cf B. Wessling, Makromol. Chem., Vol. 185, 265-1275, 1984. By reference the contents of this paper form part of the disclosure of the present description.

The literature provides the following information concerning the physical characteristics and processability of conductive polymers and organic conductors:

High crystallinity, e.g. polycrystalline powders, in individual cases long needle-shaped crystals (for TCNQ, cf Hanack, 1982), or other macroscopic crystal shapes, e.g. in the case of polyphthalocyanines. In the case of polyacetylene, the size of the crystallites clearly does not exceed 100 Å (D. White et al, Polymer, Vol. 24, p. 805, 1983).

Polyconjugate polymers are, in their basic state, insulators, as opposed to polymer-bridged charge transfer complexes, such as polyphthalocyanines (cf Hanack, loc. cit, pp. 269/270).

Optical appearance generally matt black (glossy or shining only if the synthesis was carried out on the smooth surfaces, cf the Shirakawa method for producing self-supporting "films", in which the side facing the glass is glossy and that remote from the glass matt). Polyphthalocyanines are non-glossy powders, which appear blue.

If, as a result of the synthesis conditions, macroscopically larger structures can be obtained, they are brittle (the exception being cis-polyacetylene). Due to their crystalline structure, charge transfer complexes are always very brittle substances, which are very difficult to process mechanically (Hanack, loc. cit, pp. 269/270). Much the same applies for uncomplexed and particularly complexed conductive polymers.

Conductive polymers and organic conductors are generally insoluble, infusible and not shapable, whilst in most cases being unstable relative to oxygen, moisture and elevated temperatures. If e.g. in the case of nonpolymeric or polymeric charge transfer complexes (TCNQ or PPhc), melting points can in fact be observed, they are close to the decomposition point, so that decomposition-free melting is either impossible or is only possible with great difficulty. To the extent that soluble derivatives exist in the case of the different conductive polymers, their conductivity is several decimal powers inferior compared with the insoluble non-modified substances. A thermoplastic deformation of conductive polymers and organic conductors has not as yet proved possible. Polypyrrole and certain representatives of the polyphthalocyanines are comparatively stable with respect to oxidative and thermal influences, cf Hanack, loc. cit; K. Kanazawa et al, J. Chem. Soc., Chem. Comm. 1979, pp. 854/855.

Hanack's 1982 statement that most organic conductors and conductive polymers were primarily produced under the standpoint of high conductivity, whilst ignoring their mechanical properties, stability and processability, still applies. The following statements are made regarding the physical characteristics of organic conductors and conductive polymers which are important for processability.

1. Insolubility

Whilst nonpolymeric organic conductors are crystallized from solutions of the two participating components and are in part still soluble in decomposition-free manner after their preparation, a solvent has not hitherto been found for conductive polymers either in the untreated or complexed form. The tests described by T. Matsumoto et al, J. Polym. Sci. A-2, Vol. 10, p. 23, 1972 with polyacetylene from polymerization induced by γ-radiation clearly did not relate to polyacetylene with the chemical uniformity as discussed here and as shown by IR-spectra, but instead related to non-uniform mixtures of different types of substituted, low molecular weight polyenes. The dissolving of polyacetylene in hot sulphuric acid (S. Miyata et al, Polym. J.,Vol. 15, pp. 557 to 558, 1983) leads to strongly oxidized, chemically changed products (A. Pron, Polymer, Vol. 24, p. 1294ff, 1983).

Solvents have also not hitherto been described for other conductive polymers. Attempts have been made for polyphthalocyanines to increase the solubility by introducing ring substituents, e.g. tert.butyl groups, but the conductivity decreases by several decimal powers. T. Inabe et al, J. Chem. Soc., Chem. Comm, 1983, pp. 1084–85 describe the dissolving of polyphthalocyanine in trifluoromethane sulphonic acid, but give no information on the characteristics of the raw material recovered therefrom.

In addition, no solvents or processes are known enabling true, deposition-stable dispersions to be prepared. Although EP-OS No. 62,211 describes polyacetylene suspensions these are in fact only suspended, coarse polyacetylene particles, without deagglomeration of the tertiary or secondary structure of the particles.

2. Melting behaviour

Both in the untreated and complexed forms, all conductive polymers cannot be melted. Although differential thermal analysis of polyphthalocyanines gives certain indications of a melting behaviour, this is accompanied by immediate decomposition. Dynamoviscoelastic tests on polyacetylene (Show-an Chen et al., Makromol. Chem. Rapid Comm., Vol. 4, pp. 503–506, 1983) show that between −100° and +350° C. there is neither a glass transition temperature nor a crystalline melting. Polyacetylene decomposition starts from approximately 350° C. The only phase transition in this range takes place at above 150° C. and is attributed to cis/trans-isomerization.

Admittedly, meltable or fusible conductive polymers have occasionally been described, but their conductivity was never satisfactory and was several decimal powers lower than in the case of the polymers under discussion here.

3. Stability

Numerous reports deal with the instability of conductive polymers. Polyacetylene is particularly sensitive to oxygen and it was reported that even when stored under an inert atmosphere and in the cold, the original polyacetylene characteristics were lost. For example, after a certain time it can no longer be stretched. Even when stored in an inert atmosphere, complexed polyacetylenes almost completely lose their excellent electrical properties after a short time. These phenomena are attributed to an oxidative decomposition and to crosslinking processes, which also occur in the case of cis/trans-isomerization (cf inter alia M. Rubner et al, J. Polym. Sci., Polym. Symp. Vol. 70, pp.45–69, 1983). The instability of polymers from 1,6-heptadiene is described by H. Gibson, J. Am. Chem. Soc., Vol. 105, pp.4417 to 4431, 1983. During heating in vacuo, this is rearranged into undefined, no longer conjugate polymers and comparable processes take place in the case of polyacetylene.

4. Formability

It has hitherto proved impossible to produce molded articles from conductive polymers or organic conductors by the master forming and shaping processes (Kunststoff-Taschenbuch, p. 52). This is directly linked with the fact that the polymers are infusible and insoluble. It has also proved impossible up to the present to produce true dispersions of these substances in organic solvents or in viscous polymers.

Cis-polyacetylene to a certain extent would appear to represent an exception in that immediately following production is to a limited extent "ductile", as described by M. Druy et al, J. Polym. Sci., Polym. Phys., Vol. 18, pp. 429–441, 1980. However, the ductility and stretchability is limited exclusively to the cis-isomer, the transisomer being brittle even in the absence of oxygen. A. MacDiarmid and A. Heeger, proceedings of a Nato ASI on Molecular Metals Les Arcs, 1979, plenary lecture, state that fresh "films" of both cis and trans-polyacetylene are flexible and easily stretchable, the latter being attributed to the partial orientation of the fibres. Shortly after synthesis, the cis-isomer also loses the ductility properties, even in the absence of oxygen, which have an extreme accelerating action on embrittlement. Among other things this is due to the fact that oxygen not only brings about an oxidative decomposition, but also leads to cis/transisomerization (J. Chien et al, J. Polym. Sci., Polym. Phys., Vol. 21, pp. 767 to 770, 1983). According to Druy, loc. cit., a volume increase unexpectedly occurs during stretching, which can be explained by the weak interfibrillar forces of attraction. It is also concluded from the stress-strain curves and the time behaviour that, even in the absence of oxygen, crosslinking processes take place, possibly due to the appearance of free radicals during cis/transisomerization.

As a result of these difficulties, shaping involves the use of methods which cannot be considered a master forming process. Thus, Shirakawa et al in EP-OS No. 26,235 describe the shaping of a gel-like polyacetylene with a solvent content of 5 to 95% by weight, which is moulded at temperatures between ambient temperature and 100° C., which leads to molded articles which are subsequently dried. The same procedure is adopted by Kobayashi et al (GB-OS No. 2,072,197) whereby freshly polymerized cis-polyacetylene with comparatively high solvent contents is molded and subsequently calendered. Before the drying process, the end product still contains approximately 5% of solvent.

A production of moulded articles, once again not by the master forming process, is described by Chien et al, Makromol. Chem. Rapid Comm., Vol. 4, pp. 5–10, 1983, who produced macroscopic polyacetylene strips by special polymerization methods.

J. Hocker et al (EP-OS No. 62,211) describe the production of moulded articles from polyacetylene-containing polymers, which are dissolved in a solvent containing macroscopic polyacetylene particles. Shaping takes place by removing the solvent. For accelerating suspension formation, optionally an Ultraturrax ® stirrer is used, the fibrous structure of the particles being retained. The thus obtained molded articles have only a comparatively low conductivity. The further EP-OS No. 84,330 of the same inventors also deals with attempts to obtain molded articles from polyacetylene-containing plastics, without using a master forming process. Attempts are made in the examples to produce laminates with a (doped) polyacetylene layer, in that polyacetylene in the form of a suspension in an easily evaporatably solvent, such as methylene chloride, is sprayed onto a substrate. The thus obtained polyacetylene layer on a polymer or an organic carrier is subsequently coated with a further protective layer.

In the case of polypyrrole, DE-OS No. 3,227,914 describes a process, in which polypyrrole is molded at temperatures of 150° to 300° C. and pressures of 50 to 150 bar. According to the examples, this process is suitable for producing multilayer laminates of nonconductive polymer films and polypyrrole films (as are directly obtained from electrochemical polymerization). Preferably, polypyrrole and the various copolymers thereof are pressed in film form onto polyester, polyethylene or polyacrylonitrile films or on polyurethane or polystyrene foam. There is clearly no shaping of the conductive polypyrrole and instead the thermoplastic flowability of the non-conductive polymer films permits the use thereof as binders. Homogeneous molded articles from a continuous polypyrrole phase or molded articles consisting solely of polypyrrole cannot be produced in this way. A further disadvantage is that the process time under non-inert conditions is 2 to 10 minutes, thin, non-conductive coatings thereby forming on the surface, and chemical decomposition processes cannot be excluded.

5. Influence of pressure

At the very start of working with conductive polymers and organic conductors, attempts were made to at least for a short time bring the substances obtained as polycrystalline powders into a form in which the electrical and photoelectrical characteristics can be tested. Therefore, reference is frequently made to the fact that powders are compressed cold under pressures of several to approximately 300 bar to give a brittle plate, cf inter alia F. Beck, Ber. deut. Bunsenges. Phys. Chem., Vol. 68, pp. 558 to 567, 1964.

It is stated in the earlier dated but not prior-published EP-OS No. 132,709 in connection with polypyrrole that at temperatures between 150° and 300° C. and pressures of 50 to 200 bar, moulded articles can be produced from pyrrole polymers of small particle size, whilst working under a normal atmosphere. The EP-OS fails to give examples for this procedure and no further details are given with respect to the surface, colour, homogeneity, strength and conductivity of the moulded articles obtained. This probably leads to relatively brittle "tablets", as are often used for the conductivity measurements of pulverulent organic conductors, but these are not homogeneous, strong molded articles, particularly with a shiny surface.

V. Zhorin, J. Appl. Sci, Vol. 28, pp. 2467–2472, 1983 deals with the influence of high pressure on the electrophysical properties of conductive polymers and establishes that the conductivity of the test pieces rises with high pressure, but reversibly drops again as the pressure decreases. At ambient temperature and under normal atmospheric conditions, the authors used pressures of up to $2.5 \times 10^3$ MPa and observed no fundamental morphological changes. The conductivity increase is attributed to a narrowing of the energy bands.

SUMMARY OF THE PROBLEMS AND OBJECTS OF THE INVENTION

Thus, conductive polymers and organic conductors together have a number of restricting disadvantages (insolubility, poor dispersibility, lack of softening ranges or glass transition temperatures, non-existent melting points and lack of stability relative to oxygen, heat and in part to crosslinking processes), which have hitherto prevented the industrial utilization thereof. In the present state of the art, these disadvantages, like the conductivity, are particularly due to the relatively high degree of crystallinity of conductive polymers and organic conductors.

The industrial usability of polyacetylene and most other conductive polymers is particularly prevented by the fact that the electrical and more particularly mechanical properties very rapidly decline, particularly after complexing. It would therefore represent an extraordinary advance in the art, if it were possible to shape conductive polymers and to achieve, both during and after deformation, a stabilization against decomposition by oxygen, moisture, heat and internal crosslinking processes. It would be of particular importance to find processes in which the conductive polymers as such or in physically slightly modified form are shaped by master forming processes and possibly simultaneously stabilized. It would be a decisive technical breakthrough, if the increase in the electrical conductivity and molded article production were combined and the achieved characteristics were also retained under conditions of use.

It is therefore an object of the invention to find a way of processing electrically conductive polymers and organic conductors such as PAc, PPP, PPy, PPhc, as well as TCNQ charge transfer complexes, etc to homogeneous moulded articles with good mechanical characteristics and a high electrical conductivity, whilst simultaneously obtaining stabilization against the various known decomposition mechanisms, particularly due to oxidative influences or crosslinking.

SUMMARY OF THE INVENTION

The present invention relates to a process for the production of molded articles from electrically conductive organic polymers and/or organic conductors, which is characterized in that well-degassed samples of substantially solvent-free and monomer-free conductive polymers and/or organic conductors are shaped, whilst excluding moisture and oxygen, at a temperature, which is above 40° C. and below the decomposition temperature of the conductive polymers and/or organic conductors, under a pressure of at least 500 bar until a continuous phase forms with a highly lustrous surface, which appears metallic and visually appears different from the starting material. It is possible to use mixtures of different conductive organic polymers or organic conductors. They can be fresh or aged samples of conductive polymers or organic conductors, provided that no oxidative decomposition has occurred. In the case of polyacetylene the latter can easily be recognised in the IR-spectrum by the carbonyl band at 1700 cm$^{-1}$.

The appearance of an intensely lustrous surface with a metallic appearance is characteristic for the occurrence of a continuous phase. The perfect polyacetylene surface obtained can only be further resolved under the electron microscope with an approximately 20,000 X magnification, the spherical primary particles no longer being recognisable as discrete particles, because they appear to be hidden as by a haze (=continuous matrix).

If e.g. doped or undoped trans-polyacetylene (black) is used, then a uniform, perfect, highly lustrous surface with a golden metallic appearance is obtained or the representation of the press die. Cis-polyacetylene gives a silver-metallic, lustrous surface on moulding below the isomerization temperature, but has a golden-metallic appearance above this temperature (the IR-spectrum shows a complete isomerization to the trans-isomer). Phthalocyanines cannot be cold-molded and in the case of the procedure according to the invention the matt blue colour of poly-$\mu$-cyano(phthalocyaninato)-cobalt (III) changes to an intensely lustrous, bright red-violet colour. Electrochemically synthesized polypyrrole dodecyl sulphonate changes from matt black to an intense black-metallic surface, which has a bluish tint in daylight.

On the basis of all the information in the literature, it is extremely surprising that e.g. polyacetylene can be processed in this way, despite the lack of thermoplastic properties and in view of the described oxidative and thermal instability, as well as its crosslinking tendency. The electrical conductivity of the moulded articles produced according to the invention rises by several decimal powers and in the case of polyacetylene e.g. from $10^{-9}$ to $10^{-12}$ Siemens/cm to more than $10^{-5}$, e.g. $10^{-4}$ Siemens/cm. There is no sign of crosslinking and no decomposition occurs. Still more surprising is the formability according to the invention of polyacetylene doped with for instance iodine or $FeCl_3$, which should preferably be homogeneously doped (see page 16).

Surprisingly, the thus obtained molded articles also have a significant mechanical strength and good elastic properties permitting their further processing to different electrical components. According to the invention, as a function of the electrical properties, the molded articles can be used as conductors, semiconductors or photoconductors, e.g. as semiconductor relays, thyristors, etc as well as in batteries or photovoltaic purposes, such as in solar technology for directly producing electric current from light. It is even more surprising that the aforementioned good mechanical properties are retained following oxidative complexing, e.g. with iodine or iron (III)-chloride, which is completely contradictory to the experience hitherto obtained with such polymers. The so-called "self-supporting films" of Shirakawa embrittle completely in the case of oxidative complexing.

DETAILED DESCRIPTION OF THE INVENTION

When shaping or forming conductive polymers or organic conductors temperatures are used which are above 40° and preferably above 100° C., but in any case they must be below the decomposition temperature of the particular material. This means e.g. in the case of polyacetylene that the temperature must not exceed 340° C. The maximum temperature usable for polyphthalocyanines is approximately 220° to 250° C.

The pressure must be a minimum of 500 bar, but preferably pressures over 1000 and up to 30,000 bar are used. Normally, a molding time of a few seconds, e.g. 15 to 30 seconds is adequate. The higher the molding pressure used and the thinner the moulded article is to be, the shorter the duration. Generally, the powder is shaped hot under pressure for between 5 and 200 seconds. In general, PPy, PPP and PPhc require higher moulding pressures, times and temperatures than PAc.

It is necessary to use well degassed samples in view of the oxidative sensitivity of the substances and for producing perfect and in particular non-porous mouldings. The forming takes place with the exclusion of moisture and oxygen, e.g. in an inert gas atmosphere, preferably under nitrogen or another protective gas. The same objective can also be achieved when working in vacuo, the residual pressure preferably being less than 100 mbar.

Whereas the electrical conductivity of undoped polyacetylene is only approximately $10^{-9}$ to $10^{-12}$ Siemens/cm, in the case of the compression according to the invention, there is a conductivity rise to more than $10^{-4}$ Siemens/cm. For bringing about a further conductivity increase, it is desirable to complex the polymer before or after forming with per se known doping agents, such as iodine, antimony or arsenic pentafluoride, tetrafluoroboric acid, sulphur trioxide, perchlorates, sulphates or metal salts, such as iron(III)-chloride for p-doping and butyl lithium, diphenylhexyl lithium, naphthalin sodium and the like for n-doping.

Preferably, complexing takes place prior to the shaping to molded articles. A particularly homogeneous doping is achieved if the polymer doping takes place with the doping agent in solution and under the action of ultrasonic, whilst using either the completely polymerized, but undoped polymer (e.g. PAc or PPhc) or the monomer (e.g. pyrrole). The latter is simultaneously polymerized and doped (cf the parallel application . . . corresponding to DE-P No. 3,422,316.9). The homogeneous doping improves the further processability considerably, and the results are significantly better.

According to a preferred embodiment, conventional antioxidants (e.g. phenolic antioxidants) and/or crosslinking inhibitors (e.g. phosphites) are added in a quantity of 0.01 to 0.5% by weight, in order to increase the stability. It is also possible to use other conventional auxiliary substances, such as lubricants, etc. For protection against oxygen and moisture, it is also possible to give the moldings a coating of an oxygen-impermeable and water-impermeable polymer, e.g. polyvinylidene fluoride or the like. This can either take place by the addition of approximately 1 to 5% by weight of the protective polymer prior to shaping or through subsequent coating. A protective coating with a thickness of a few microns is generally sufficient.

A complete explanation for the success of the process of the invention cannot at present be given. If account is taken of the known polyacetylene characteristics (high crystallinity, no melting and softening range, instability, considerable crosslinking tendency particularly in the case of cis/trans-isomerization and thermal stressing, embrittlement on doping and during prolonged storage), it is not possible to give an explanation for a crosslinking-free cis/trans-isomerization during vacuum hot shaping, accompanied by the formation of homogeneous, elastic, stable, highly lustrous molded articles from optionally doped, fresh or long-term stored transpolyacetylene, as well as the possibility of subsequent doping of the moldings obtained according to the invention without any significant deterioration to the mechanical properties or stability. The appearance of homogeneous phases is particularly unexpected ("fusion" of the previously discrete primary particles), which is optically visible through highly lustrous surfaces with a metallic appearance of different colour under the electron microscope by an interfusion of the agglomerates and the primary particles.

Only if it is assumed that the conductive polymers and organic conductors are liquid crystals or highly ordered liquids and not crystalline solids, can the surprising results of the invention now in hindsight be interpreted. Although hitherto no direct proof has been provided, various contradictory phenomena, e.g. in the case of polyacetylene can be reconciled if it is assumed that:

The "ductility" of fresh cis-polyacetylene results from a not yet complete liquid crystal order.

The embrittlement of undoped "films" is the result of progressively higher orientation of the liquid crystalline phase within the spherical primary particles, so that contacts between the particles are increasingly punctiform.

Embrittlement by oxidative decomposition is mainly the consequence of the increased forces of repulsion between the primary particles due to surface oxidation.

The embrittlement of doped "films" is less a crosslinking process than the consequence of increased "rearrangement" in the liquid crystal and of a destruction of residues of continuous homogeneous phases; it is reinforced by the inhomogenity of the doping, which leads to rearrangement processes, for instance by diffusion.

According to the invention, the embrittlement is eliminated by the action of pressure and heat, because this leads to the liquid crystals becoming ordered again and to the formation of macroscopic ranges of continuous homogeneous phases.

The production of homogeneous phases results from a true flowing of a "highly viscous" fluid.

The production of highly stable and highly conductive moldings from homogeneously doped conductive polymers, e.g. from PAc homogeneously doped with $J_2$, is possible as a result of improved "flowability" of the homogeneous starting substances compared with heterogeneously doped polymers, the drastically increased stability resulting from the homogeneity of the doping and the homogeneity of the molding (uniform phases), which do not give rise to rearrangements.

The reversible pressure dependence of the conductivity observed by Zhorin is only due to the increase in the number of electrically conductive contact points, without there being a rearrangement of the liquid crystals and a formation of macroscopic, liquid crystalline, ordered ranges as in the process according to the invention.

The visually observed colour change is due to the macroscopic, liquid crystalline order in the material after forming.

The marked stability increase results (a) from the incapacity of the substances shaped according to the invention to lower the high liquid crystal order without external influences, (b) the inner and outer surface, accessible to oxygen and water which is only smaller by decimal powers, (c) the crosslinking reaction tendency passing towards 0 in the highly ordered liquid crystal (=volume increase).

In the case of very difficultly produceable and particularly thin molded polyacetylene films, it is occasionally possible to observe under the polarization microscope phenomena which are characteristic of liquid crystals. It has further been possible to produce with a microtom thin cuts which are transparent in the dark field of a polarization microscope and which exhibit the double refraction typical for crystals and liquid crystals, respectively. At present the above tentative explanations are of a purely hypothetical nature, although the liquid crystal hypothesis appears to be the only one which can reconcile the results obtained according to the invention which contradict the present state of the art. Our own research (cf B. Wessling, Makromol. Chem. Vol. 185, 1265–1275 (1984)) according to which in polyacetylene the spherical primary particles consist of crystallites in an amorphous matrix can only explain that in the hot shaping according to the invention a compression or compaction process to a very tightly pressed sphere packing is possible. However, this hypothesis does not provide a contradiction-free explanation of other phenomena (e.g. colour change and stability increase).

The hot shaping according to the invention preferably takes place by molding, although there are alternatives thereto. This can be performed on a continuous basis e.g. by extruders or so-called ram extruders, if it is sealed against the outside air and evacuatable on the reciprocating press die and degassing and an inert gas atmosphere are ensured in the charging hopper. There must simultaneously be a uniform preheating.

Figure 1:
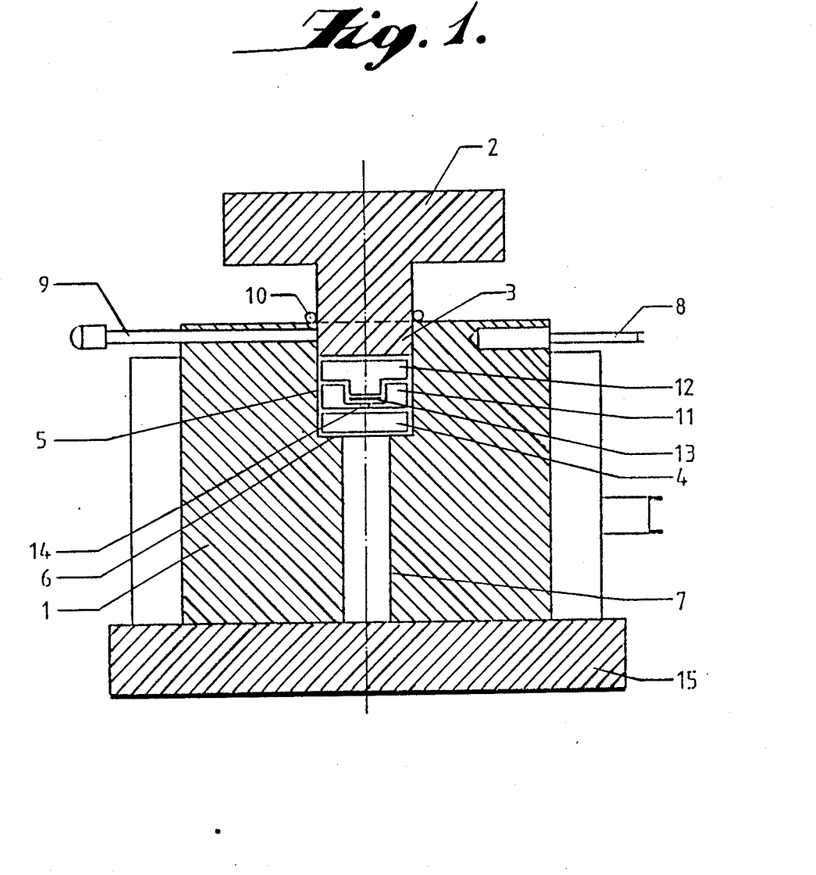
FIG. 1 shows a cross-section of a press for performing a process according to the present invention.

The invention also relates to a particularly preferred press for performing the process according to the invention and which is diagrammatically shown in sectional view in FIG. 1.

The apparatus comprises a heatable cylinder or mould block 1 with a bore 5 receiving the press die 2, 3. A gasket 10 ensures an air-tight seal with respect to the outside. In the represented embodiment, bore 5 has a downwardly open constriction 7, which is tightly closed by base plate 15. A movable plate 4 as an abutment for the die is located on the resulting shoulder 6.

Between the die and the abutment is provided a press capsule 11, 12 which, by means of cylinder bore 7 and a like 9, can either be filled with inert gas or evacuated. The capsule comprises a cover 12 constructed as a press ram and a lower part 11, which receives the sample and interacts with the cover 12. In the represented embodiment, a support plate 3 receiving the sample to be molded is placed on the base surface of lower part 11 of the capsule. A temperature sensor 8 is inserted in mold block 1 for temperature control purposes.

For performing the process according to the invention, initially the capsule 11, 12 is charged with the sample to be molded, this preferably taking place under an inert gas. With the die 2, 3 raised, the capsule is then introduced into cylinder bore 5 in such a way that it stands on plate 4. By lowering the die 2, 3 cylinder bore 5 is sealed at the top, so that a vacuum can be applied via line 9. Following the complete degassing of the sample and heating the capsule through the preheated cylinder block 1 to the selected temperature, the sample is molded under the predetermined pressure and for the selected time by means of die 2, 3. Following the raising of the latter, plate 4 with the capsule on it can be raised through bore 7 with the aid of a corresponding tool and can then be removed from the press. In the same way, after raising cover 12, the sample together with the support plate 13 can be removed from the capsule, in that both are shoved upwards through bore 14 with the aid of a tool. The molding can, if desired, subsequently be separated from plate 13.

The molding result can be improved in that the die is made rotary, whilst the abutment is anchored in such a way that it cannot rotate. Thus, during moulding, there is simultaneously a shearing of the material between the rotary die and the locked abutment.

According to a further embodiment of the apparatus, the die can simultaneously be constructed as an ultrasonic generator, in order to bring about an additional homogenization and compression of the material. When producing thicker moldings with a thickness of $>100$ microns a preform is preferably initially molded in the aforementioned apparatus and then, in vacuo, and under action of ultrasonics and a lower pressure, can be completely moulded to homogeneous phases which can no longer be electro-nmicroscopically resolved, as is proved by fracture surfaces produced under liquid nitrogen.

The following examples serve to further illustrate the invention, but the invention is not limited thereto.

EXAMPLE 1

A polyacetylene powder sample containing cis-polyacetylene was produced according to the Luttinger method (cf B. Wessling, Makromol. Chem. 185, 1265–1275, (1980)), was molded for 5 sec, a vacuum of 3 mbar, a temperature of 80° C. and a pressure of 16,000 bar in the mould according to FIG. 1. A silver lustrous small plate was formed with a conductivity of $2.3 \times 10^{-5}$ Siemens/cm. The conductivity of the original powder sample was $10^{-10}$ Siemens/cm.

EXAMPLE 2

An acetylene powder sample according to example 1 was initially tempered for 1 hour at 150° C. and converted into pure trans-polyacetylene. As described in example 1, the sample was then molded at 150° C. for 30 sec in a vacuum of 3 mbar, which led to gold-shimmering small plates with a highly lustrous smooth surface. The conductivity rose from $10^{-9}$ to $5 \times 10^{-4}$ Siemens/cm. The completely smooth surface revealed a weak structure only under the electron microscope with a 20,000 x magnification. The molding obtained was elastic.

EXAMPLE 3

A polyacetylene sample was subjected to a pressure of 12,000 bar at 100° and 150° C., for in each case different times, as described in example 2. The polyacetylene was introduced into the capsule under a nitrogen flow and was then molded under a dynamic vacuum. The resulting moldings (cylindrical plates of diameter 12 mm and approximately 1 to 2 mm thick) were hard and mechanically stable. The surface shimmered golden and under the microscope revealed the die structure. The continuous conductivity was measured over the entire surface at a pressure of 1000 bar. The measured values obtained are given in the following table 1:

TABLE 1

| Molding time | Conductivity (Siemens /cm) | |
|---|---|---|
| (sec) | at 100° C. | at 150° C. |
| 20 | $1.3 \times 10^{-4}$ | $5.1 \times 10^{-4}$ |
| 39 | $2.3 \times 10^{-4}$ | $5.7 \times 10^{-4}$ |
| 60 | $2.5 \times 10^{-4}$ | $5.7 \times 10^{-4}$ |
| 120 | $2.7 \times 10^{-4}$ | $5.5 \times 10^{-4}$ |
| 240 | $4.4 \times 10^{-4}$ | $7.6 \times 10^{-4}$ |

Within the framework of the measuring precision, at constant temperature there is a slight conductivity rise, as a function of the moulding time, whilst the polyacetylene molded at 150° C. had roughly twice the specific conductivity of that molded at 100 ° C.

EXAMPLE 4

Initially, 300 mg of polyacetylene were suspended in a solution of 5 g of $FeCl_3$ in 100 ml of acetonitrile and left to stand for 24 hours at ambient temperature. The solution then underwent suction filtering and the solids were washed with a little acetonitrile and dried in vacuo. The thus obtained, oxidatively complexed, polyacetylene powder was filled into the cold capsule and under a nitrogen atmosphere and in accordance with example 3, followed by hot molding in vacuo at 150° C. and under 12000 bar. This led to a solid molding with a highly lustrous, golden surface. The specific conductivity was $2.9 \times 10^{-1}$ Siemens/cm.

EXAMPLE 5

Figure 3:
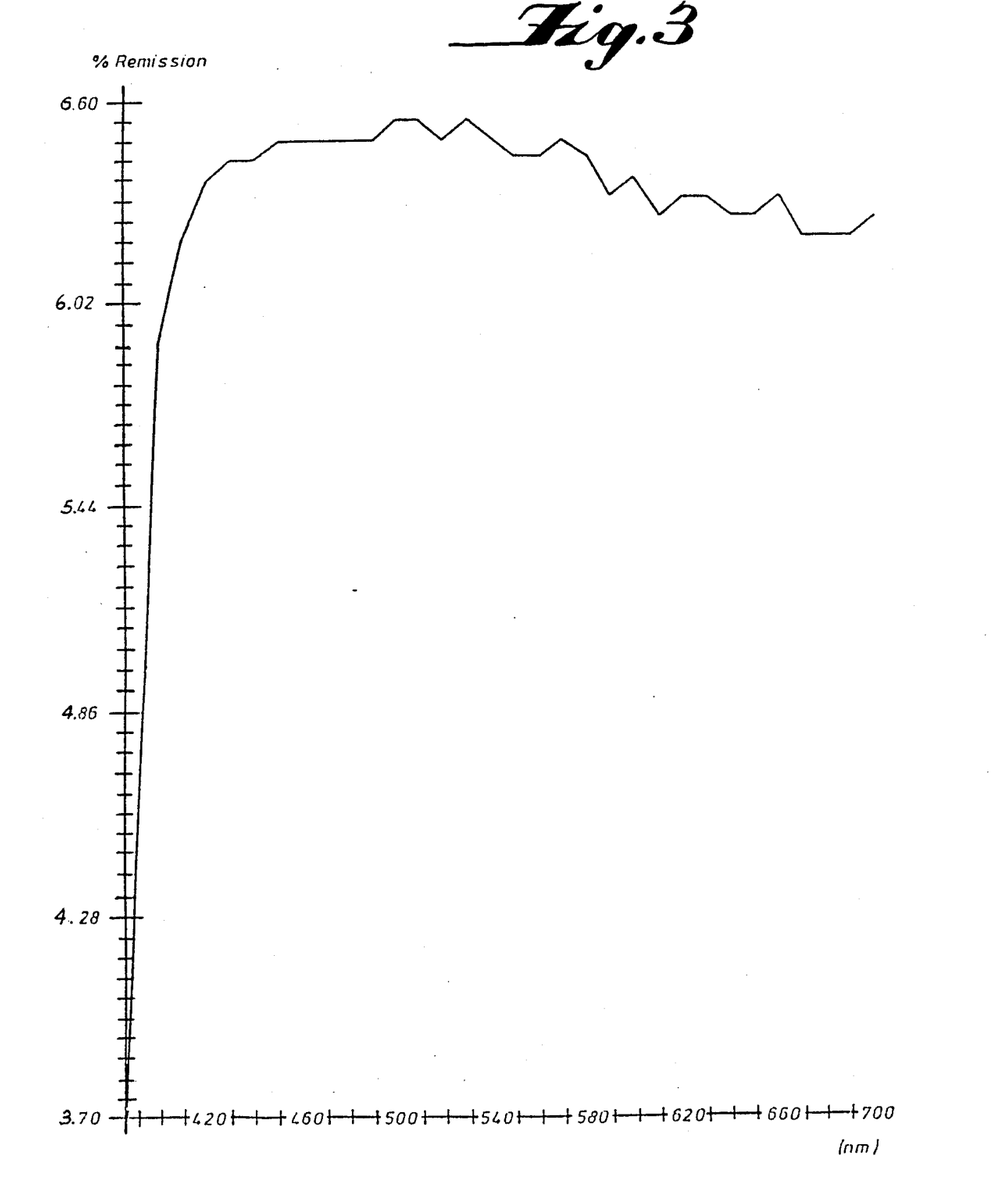
FIGS. 3 and 4 show the remission spectra of samples made according to Example 5 of the present specification.

In the same way as in example 1, a polypyrroledodecyl sulphonate sample was molded at 190° C. for 40 sec under a vacuum of 3 mbar. This led to a stable, blue-black, metallic lustrous molding. The conductivity of the molding of 20 Siemens/cm corresponded to that of the starting sample. FIG. 3 shows the remission spectrum.

Figure 4:
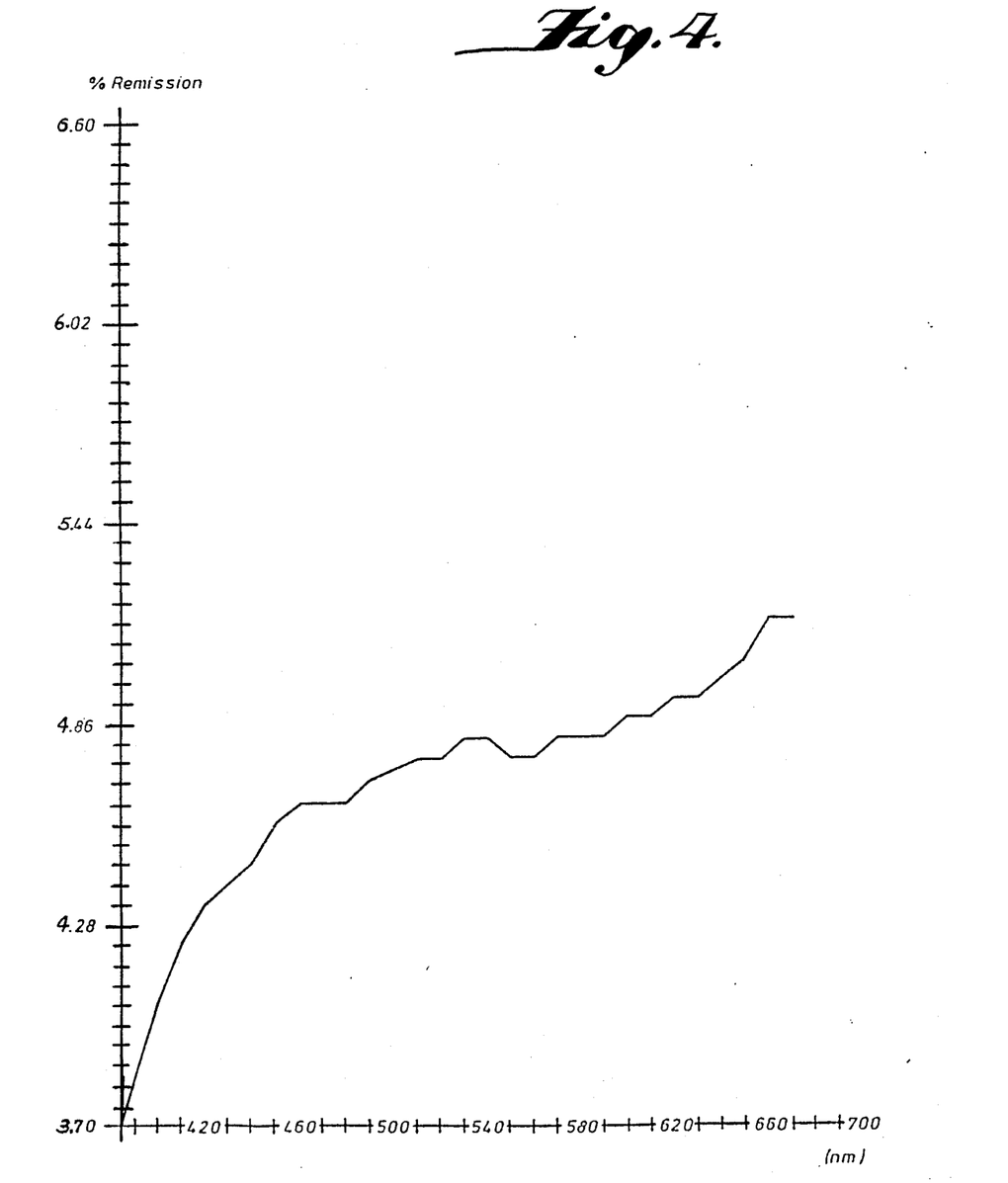

The analogous processing of PPy of small particle size subsequently homogenized by suspension in a suitable diluent and under the action of ultrasonics gives an improved stability, conductivity and colour, FIG. 4 showing the remission spectrum.

EXAMPLE 6

A sample of poly-$\mu$-cyano-(phthalocyaninato)cobalt (III) in the form of a blue powder was molded, in accordance with example 1, at 150° C., for 20 sec and under a vacuum of 3 mbar. The molding obtained had a highly metallic, bright red-violet lustre, as opposed to a cold-molded sample, which only shimmered violet in punctiform manner and remained pulverulent. The mechanical strength of the moulding was lower than that in the case of polyacetylene, but the conductivity rose from $<10^{-2}$ to approximately $10^{-1}$ Siemens/cm. By increasing the temperature to 190° C. and the molding time to 40 sec, the mechanical characteristics were significantly improved.

EXAMPLE 7

A polyacetylene moulding obtained according to example 2 and into which had been pressed two copper wires for continuously measuring the conductivity, was exposed to an iodine vapour-saturated nitrogen atmosphere at ambient temperature. Within 4 days, the conductivity rose from $3.5 \times 10^{-5}$ Siemens/cm to 16 Siemens/cm. The mechanical stability was unchanged.

Figure 5:
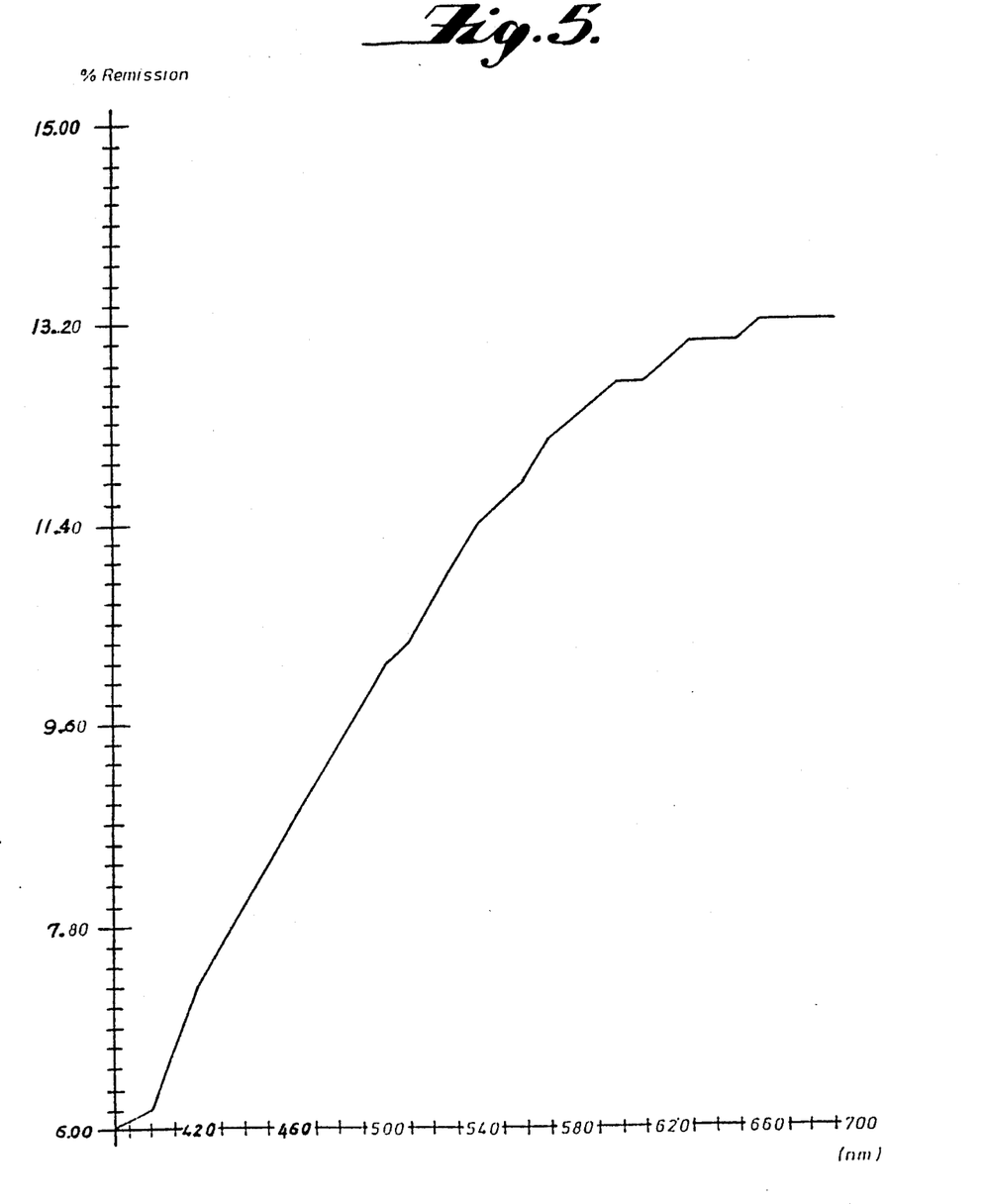
FIG. 5 shows the remission spectrum of a sample made according to Example 7 of the present specification.

In the same way, polyacetylene homogeneously doped with iodine was molded at ambient temperature at 150° C. giving moldings with a yellow-golden metallic lustre and a conductivity of 0.5 Siemens/cm with in each case very good mechanical characteristics. FIG. 5 shows the remission spectrum of the latter sample. There was substantially no conductivity drop when storing in air for several weeks and the colour remained unchanged for a long time.

EXAMPLE 8

A 1,2 cm diameter and 0.5 mm thick moulding obtained according to example 3 was left for 3 days in a solution of 5 g of $FeCl_3$ in 50 ml of acetonitrile at ambient temperature. The conductivity rose from $4.9 \times 10^{-7}$ Siemens/cm to $1.3 \times 10^{-2}$ Siemens/cm.

EXAMPLE 9

A molding according to example 12 was left to stand for 3 days at ambient temperature in a solution of 5 g of $J_2$ in 50 ml of $CCl_4$. The conductivity rose from $4.5 \times 10^{-7}$ Siemens/cm to $2 \times 10^{-1}$ Siemens/cm.

EXAMPLE 10

Figure 2:
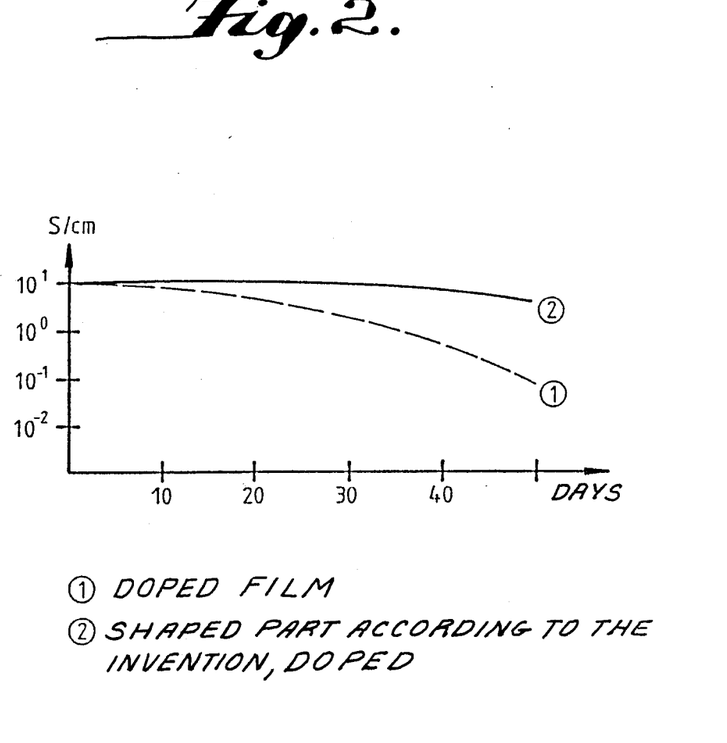
FIG. 2 shows the conductivity plotted against time for a doped film (1) and a doped, molded article (2) according to the present invention.

A polyacetylene "film" (produced according to Luttinger using the 1981 modification by G. Wegner) and the trans-polyacetylene molding of example 2 were complexed with iodine to the same conductivity (approximately 10 Siemens/cm), as described in example 7. The two parts were then stored under $N_2$ and the conductivity was checked once a week. The conductivity of the molding according to the invention underwent substantially no change during the measurement period, as is shown by the graph of FIG. 2.

EXAMPLE 11

A thin molding produced with pressed in copper wires according to example 2 was exposed to light under a 150 W halogen fluorescent tube. The conductivity measured between the copper wires rose from $4.1 \times 10^{-4}$ Siemens/cm in the dark to $9.4 \times 10^{-4}$ Siemens/cm under lighting.

EXAMPLE 12

The various samples of conductive polymers and organic conductors were molded at ambient temperature and 150° C., the samples being subject to a molding process pressure of 12,000 bar at 30 sec. The results obtained are given in the following table 2.

TABLE 2

| Starting material material | Moulded at ambient temperature | Moulded at 150° C. under dynamic vacuum |
| --- | --- | --- |
| cis-PAc (black powder) | silver-shining, soft moulding | silver-golden, metallic lustrous, mechanically stable, elastic moulding. |
| trans-PAc (black powder) | black, brittle, compact | golden-metallic lustrous, mechanically stable, elastic moulding. |
| PAc homogeneously doped doped with $J_2$ | golden, lustrous, stable elastic conductive moulding | red-gold lustrous, stable, elastic highly conductive moulding |
| PAc doped with $FeCl_3$ (black powder) | black, compact, disintegrating to powder on removal from the mould | black lustrous, mechanically stable moulding |
| Polypyrrole-dodecylsulphonate (black powder) | black powder | black metallic lustrous moulding, with a bluish shimmer; not mechanically very stable; stable mouldings are only obtained at >190° C. |
| PPy, subsequently treated (rehomogenized) | brittle black moulding | very stable, black-blue metallic lustrous, highly conductive moulding |
| Poly-$\mu$cyano(phthalocyaninato)-cobalt (III) (blue powder) | blue to violet compact, which disintegrates on removing from the mould | mechanically somewhat stronger moulding (further increase in strength after moulding at approximately 190° C. with a powerful bright red-violet, metallic lustre |

We claim:

1. A process for the production of molded articles from electrically conductive organic polymers and/or organic conductors, comprising:

well-degassed samples of substantially solvent-free and monomer-free conductive polymers and/or organic conductors are shaped, whilst excluding moisture and oxygen, at a temperature above 40° C but below the decomposition temperature of the conductive polymers and/or organic conductors, at a pressure of at least 500 bar until a continuous phase forms, said phase having a highly lustrous surface, which appears metallic and visually shows a color which is different from the starting material.

2. Process according to claim 1, wherein pressure between 1,000 and 30,000 bar is used.

3. Process according to claim 1, wherein the conductivity of the electrically conductive polymer is increased by doping before or after shaping.

4. Process according to claim 1, wherein shaping takes place under (a) an inert gas atmosphere or (b) under a vacuum of less than 100 mbar residual pressure.

5. Process according to claim 1, wherein prior to shaping, antioxidants and/or crosslinking inhibitors are added in a quantity of 0.01 to 0.5% by weight.

6. Process according to claim 1, wherein prior to shaping, 0.5 to 5% by weight of a polymer blocking oxygen and water access are added.

7. Process according to claim 1, wherein shaping takes place by moulding.

8. Process according to claim 1, wherein for continuous molding purposes, an extruder or a ram extruder is used and the molding material is supplied to and maintained in the extruder under vacuum.

9. Process according to claim 1, wherein multilayer moldings, films or plates are obtained by coextrusion or multicomponent injection molding.

10. Process according to claim 9, wherein products are obtained, said products having outer coatings comprising a polymer having a low oxygen and/or water vapor permeability coefficient, said products having a core layer comprising an electrically conductive to highly conductive polymer.

11. A process for producing molded articles composed of electrically conductive organic polymers, electrically conductive organic polymers and organic conductors, or organic conductors essentially in:

shaping a well-degassed substantially solvent-free and monomer-free sample composed of conductive polymers, conductive polymers and organic conductors, or organic conductors in the absence of oxygen and in the absence of moisture at a temperature greater than 40° C. but below the composition temperature of said conductive polymers and/or said organic conductors, said shaping being conducted at a pressure ranging from about 1,000 to 30,000 bar whereby a continuous phase is obtained, said continuous phase having a highly lustrous surface, said lustrous surface appearing metallic and visually having a color distinct from the organic polymers and/or organic conductors.

* * * * *